United States Patent [19]

Wolff et al.

[11] 4,443,225
[45] Apr. 17, 1984

[54] LIQUID-CRYSTALLINE PHASE OF AN AZO REACTIVE DYESTUFF, AND ITS USE FOR THE DYEING AND PRINTING OF NATURAL AND SYNTHETIC SUBSTRATES

[75] Inventors: Joachim Wolff, Cologne; Karlheinz Wolf, Leverkusen; Jochen Koll, Odenthal; Reinhold Hörnle, Cologne; Hans-Heinz Mölls, Leverkusen; Volker Paulat, Monheim, all of Fed. Rep. of Germany

[73] Assignee: Bayer Aktiengesellschaft, Leverkusen, Fed. Rep. of Germany

[21] Appl. No.: 444,024

[22] Filed: Nov. 23, 1982

[30] Foreign Application Priority Data

Dec. 11, 1981 [DE] Fed. Rep. of Germany ....... 3149129

[51] Int. Cl.³ .................. C09B 62/00; D06P 1/38
[52] U.S. Cl. ........................................ 8/549; 8/437; 8/553; 8/620; 8/688; 8/917; 8/918; 8/919; 252/299.01; 252/299.61
[58] Field of Search ............... 8/549, 553, 620, 437; 252/299.01, 299.61

[56] References Cited

U.S. PATENT DOCUMENTS

| 4,137,193 | 1/1979 | Osman et al. | 252/299 |
| 4,145,114 | 3/1979 | Coates et al. | 260/156 |
| 4,153,343 | 5/1979 | Bloom et al. | 260/156 |
| 4,309,182 | 1/1982 | Koll et al. | 8/527 |
| 4,309,183 | 1/1982 | Koll et al. | 8/527 |
| 4,363,743 | 12/1982 | Moeller et al. | 252/299.1 |

*Primary Examiner*—A. Lionel Clingman
*Attorney, Agent, or Firm*—Sprung, Horn, Kramer & Woods

[57] ABSTRACT

The lyotropic, liquid-crystalline, aqueous phase of a reactive dyestuff of the formula

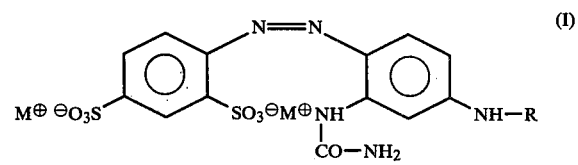

wherein
M⊕ represents H⊕ or an alkali metal cation (preferably Na⊕, K⊕ or Li⊕) and
R is a fibre-reactive grouping present in water at room temperature in a concentration of 10–25%, if appropriate in the presence of concentration-increasing additives and/or buffer substances, is highly suitable for preparing dyebaths and print pastes for application to natural and synthetic substrates, in particular cotton, wool, regenerated cellulose, paper and leather.

5 Claims, No Drawings

LIQUID-CRYSTALLINE PHASE OF AN AZO REACTIVE DYESTUFF, AND ITS USE FOR THE DYEING AND PRINTING OF NATURAL AND SYNTHETIC SUBSTRATES

The present invention relates to the lyotropic liquid-crystalline, aqueous phase of a reactive dyestuff of the formula

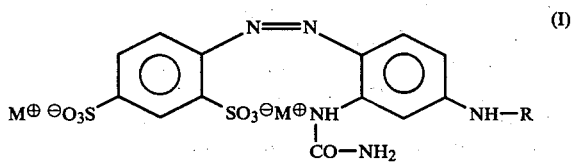

wherein $M^\oplus$ represents $H^\oplus$ or an alkali metal cation (preferably $Na^\oplus$, $K^\oplus$ or $Li^\oplus$) and R is a fibre-reactive grouping present in water at room temperature in a concentration of 10–25%, if appropriate in the presence of concentration-increasing additives and/or buffer substances. The phase is highly suitable for preparing dyebaths and print pastes for application to natural and synthetic substrates, in particular cotton, wool, regenerated cellulose, paper and leather.

R preferably represents fibre-reactive groupings of the formulae

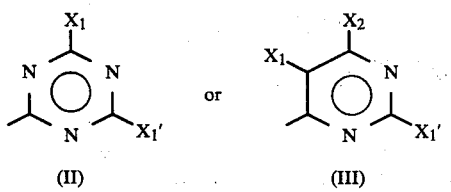

wherein $X_1$ and $X_1'$ are identical or different and represent chlorine or fluorine, and $X_2$ represents chlorine, fluorine or methyl.

Two particularly preferable dyestuffs are of the formulae (IV) and (V)

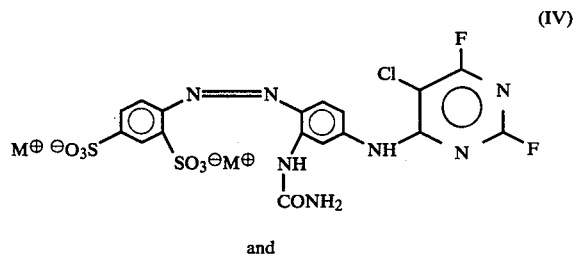

and

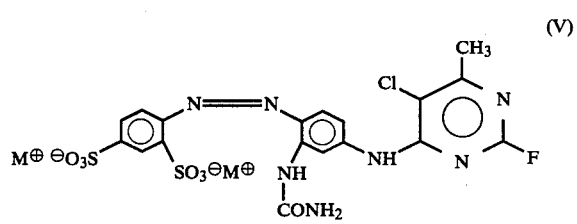

wherein $M^\oplus$ has the abovementioned meaning.

This phase displays formation of a structured diffraction diagram in X-ray small angle diffraction and birefringence characteristic of liquid crystals.

These lyotropic liquid crystals are characterised, as is customary, by the interference colours forming due to the birefringence on interposing these liquid crystals between crossed nicols of a polarising microscope and/or by the structured diffraction diagram in X-ray small angle diffraction with Cu-K α-radiation in a Kiessig chamber (compare, for example, G.H. Brown: Flüssige Kristalle [liquid crystals]; Chem. uns. Zeit, 2, 1968, pages 43–51 and Eckert and Kramer: Pharmazie uns. Zeit 1, 1972, pages 116–121).

Lyotropic liquid-crystalline aqueous phases according to the invention, of dyestuffs of the formula (I), are obtained by adding the corresponding reactive dyestuff of the formula (I) at a slightly elevated temperature in a dry or moist form, for example as a moist press cake, or also as a low-salt concentrate, or as mixtures of these forms, to an aqueous solution composed of one or more concentration-increasing additives and buffers and stirring the mixture. After a short time in this medium the dyestuff assumes a lyotropic liquid-crystalline form.

The following substances, or mixtures thereof, are suitable for use as concentration-increasing additives:

1. Organic solvents which are miscible with water and which do not lead to hydrolysis of the reactive dyestuff of the formula (I), such as esters and amides, for example 2-oxo-1,3-dioxalane or ε-caprolactam;

2. hydrotropic substances, such as urea and its derivatives and/or sulphuric acid esters of aminoalcohols, for example sulphuric acid mono-(2-aminoethyl ester);

3. anionic or nonionic surfactants, of which condensation products of aromatic sulphonic acids and formaldehyde, lignosulphonates or polyvinylpyrrolidones are to be mentioned as particularly preferable; and 4. ammonium salts, preferably ammonium sulphate.

Possible suitable buffers for the liquid-crystalline phases according to the invention are the buffer mixtures (for pH range 6–8) customary for reactive dyestuffs, such as, for example, phosphate buffers.

The low-salt concentrate used, and which is particularly suitable for relatively highly concentrated formulations, is preferably prepared by subjecting a dilute salt-containing solution of the reactive dyestuff to pressure permeation.

The lyotropic liquid-crystalline phase of dyestuffs of the formula (I) in water contains 10–25% by weight of dyestuff (I), preferably 15–20% by weight of dyestuff (I), 0–2% by weight of buffer substance (for pH 6–8), preferably 0.5% by weight of buffer substance, and in the case of phases containing a high dyestuff concentration up to 25% by weight (preferably 8–25% by weight) of the concentration-increasing additive.

The liquid formulation thus prepared is distinguished by a very satisfactory shelf life and stability to hydrolysis.

EXAMPLE 1

An additional amount of 8 g of dry salt-containing dyestuff (IV), 11.5 g of ammonium sulphate and 0.5 g of dipotassium hydrogenphosphate are added at 50° C. with stirring to 80 g of an almost salt-free aqueous formulation which contains 9% of the dyestuff of formula (IV) (wherein $M^\oplus = Na^\oplus$).

This produces a lyotropic liquid-crystalline phase of the dyestuff IV in water which has satisfactory shelf life and hydrolysis resistance and which displays the characteristic interference colours on interposition between crossed nicols in a polarising microscope. After this formulation has been stirred into water with the addition of auxiliaries customary for reactive dyeing a dye solution is obtained for dyeing natural and regenerated cellulose fibres in reddish-tinged yellow shades.

EXAMPLE 2

10 g of polyvinylpyrrolidone having a mean molecular weight of 40,000 and 10 g of ammonium sulphate are added with stirring to 100 g of an almost salt-free aqueous formulation which contains 28 g of the dyestuff of the formula (V) (wherein $M^\oplus = Na^\oplus$). This produces a lyotropic liquid-crystalline phase of the dyestuff of the formula (V) in water which on interposition between crossed nicols in a polarising microscope displays the characteristic interference colours. The addition of auxiliaries customary for reactive printing produces a dyestuff formulation for printing natural and regenerated cellulose fibres in reddish-tinged yellow shades.

We claim:

1. Lyotropic liquid-crystalline aqueous phase of a reactive dyestuff of the formula

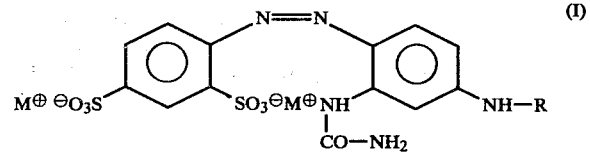

wherein
 $M^\oplus = H^\oplus$ or an alkali metal cation and
 R = a fibre-reactive grouping
present in water at room temperature in a concentration of 10–25%, optionally in the presence of concentration-increasing additives and/or optionally in the presence of buffer substances.

2. Lyotropic liquid-crystalline phases according to claim 1, characterised in that in the formula (I) R represents the fibre-reactive groupings of the formulae

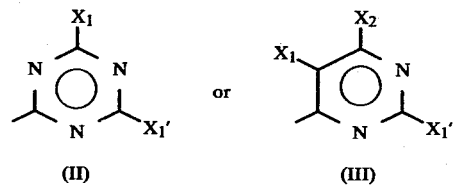

wherein
 $X_1$ and $X_1'$ are identical or different and represent chlorine or fluorine,
 $X_2$ represents chlorine, fluorine or methyl and
 $M^\oplus$ represents $H^\oplus$, $Na^\oplus$, $K^\oplus$ or $Li^\oplus$.

3. Lyotropic liquid-crystalline phase according to claim 1, containing the dyestuff of the formula

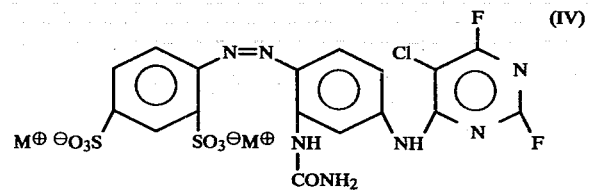

4. Lyotropic liquid-crystalline phase according to claim 1, containing the dyestuff of the formula

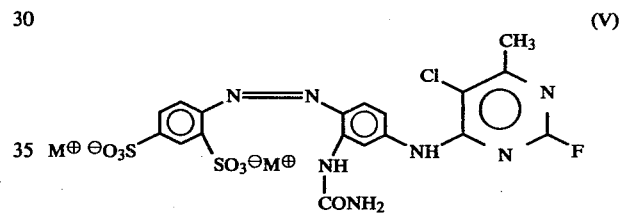

5. Lyotropic liquid-crystalline phase according to claim 1, containing ammonium salts and/or polyvinyl-pyrrolidone as concentration-increasing additives.

* * * * *